(12) United States Patent
Cmajdalka

(10) Patent No.: US 11,221,192 B2
(45) Date of Patent: Jan. 11, 2022

(54) ANIMAL FEED LAUNCHER APPARATUS

(71) Applicant: Paul Cmajdalka, Brenham, TX (US)

(72) Inventor: Paul Cmajdalka, Brenham, TX (US)

( * ) Notice: Subject to any disclaimer, the term of this patent is extended or adjusted under 35 U.S.C. 154(b) by 0 days.

(21) Appl. No.: 16/801,727

(22) Filed: Feb. 26, 2020

(65) Prior Publication Data

US 2021/0259205 A1 Aug. 26, 2021

(51) Int. Cl.
*F41B 7/00* (2006.01)
*A01K 5/00* (2006.01)

(52) U.S. Cl.
CPC . *F41B 7/00* (2013.01); *A01K 5/00* (2013.01)

(58) Field of Classification Search
CPC ... F41B 7/00; F41B 7/003; F41B 7/08; A01M 31/008; A01K 15/025; A01K 5/00
USPC .................. 124/16, 27; 119/51.01, 702, 707
See application file for complete search history.

(56) References Cited

U.S. PATENT DOCUMENTS

| | | | | | |
|---|---|---|---|---|---|
| 706,399 | A | * | 8/1902 | Fifer ...................... | F41B 7/006 124/29 |
| 899,448 | A | * | 9/1908 | Grobl ..................... | F41B 7/006 124/27 |
| 1,421,234 | A | * | 6/1922 | Houghton .............. | A63H 33/20 446/53 |
| 2,111,631 | A | * | 3/1938 | Jones ...................... | F41B 7/00 124/29 |
| 2,225,719 | A | * | 12/1940 | Shotton .................. | A01K 91/02 43/19 |
| 2,523,805 | A | * | 9/1950 | Anthony ............... | A63B 69/407 124/16 |
| 2,600,883 | A | * | 6/1952 | King ........................ | F41B 7/00 124/63 |
| 2,962,837 | A | * | 12/1960 | Lemelson ................ | A63H 5/04 446/193 |
| 3,191,342 | A | * | 6/1965 | Norris et al. .......... | A63H 27/14 446/231 |
| 3,192,915 | A | * | 7/1965 | Norris ................... | A01K 5/0275 124/77 |
| 3,515,111 | A | * | 6/1970 | Auge .................... | A63F 9/0252 124/16 |
| 3,850,157 | A | * | 11/1974 | Prokupek .............. | A63B 69/407 124/27 |
| 4,036,203 | A | * | 7/1977 | Chapman ................. | F41B 7/08 124/21 |
| 4,565,183 | A | * | 1/1986 | Smith ..................... | F42B 12/40 124/26 |
| 5,033,446 | A | * | 7/1991 | Bradt .................... | F42B 12/362 124/26 |
| 5,456,036 | A | * | 10/1995 | Butz ................... | A01M 31/008 124/26 |
| 5,491,924 | A | * | 2/1996 | Athanasiadis ......... | A01K 91/02 124/27 |

(Continued)

*Primary Examiner* — Alexander R Niconovich

(57) ABSTRACT

An animal feed launcher apparatus for feeding and attracting animals from a distance includes a launch tube having a tube proximal end, a tube distal end, and a sidewall defining a tube inside. The sidewall has at least one cocking slot extending through to the tube inside. The tube inside slidingly receives a feed sock filled with animal feed. A cap is coupled to the launch tube within the tube proximal end. A disc is coupled within the launch tube and is slidably engaged within the tube inside. A compression spring is coupled to the disc and extends between the disc and the cap within the tube inside. A cocking pin coupled to the disc and extends through the cocking slot.

8 Claims, 4 Drawing Sheets

(56) References Cited

U.S. PATENT DOCUMENTS

| | | | | |
|---|---|---|---|---|
| 5,597,160 A * | 1/1997 | Mims | A63B 69/407 | |
| | | | 124/16 | |
| 5,979,424 A * | 11/1999 | Alvarez | F41B 7/08 | |
| | | | 124/16 | |
| 6,669,530 B2 * | 12/2003 | Du | A63H 37/00 | |
| | | | 124/16 | |
| 7,703,447 B2 * | 4/2010 | Caveza | A01K 5/0114 | |
| | | | 124/16 | |
| 8,393,299 B1 * | 3/2013 | Bernat | A01K 15/025 | |
| | | | 119/702 | |
| 9,004,013 B2 * | 4/2015 | Bianchi | F42C 19/083 | |
| | | | 119/719 | |
| 9,044,686 B2 * | 6/2015 | Aguila | A63H 37/00 | |
| 9,261,322 B1 * | 2/2016 | Conkel | F41B 7/006 | |
| 9,279,636 B1 * | 3/2016 | Nash | F41B 7/003 | |
| 9,352,244 B2 * | 5/2016 | Aguila | A63H 37/00 | |
| 9,658,023 B1 * | 5/2017 | Powell | F41B 3/03 | |
| 9,970,732 B2 * | 5/2018 | Mellen | A01K 15/025 | |
| 10,182,554 B1 * | 1/2019 | Santiago | A63B 69/407 | |
| 2003/0143922 A1 * | 7/2003 | Du | A63H 37/00 | |
| | | | 446/475 | |
| 2011/0197819 A1 * | 8/2011 | Montgomery | A01K 5/0225 | |
| | | | 119/51.11 | |
| 2012/0048201 A1 * | 3/2012 | Qian | A01K 5/0114 | |
| | | | 119/57.92 | |
| 2013/0133581 A1 * | 5/2013 | Anderson | A23K 40/20 | |
| | | | 119/51.01 | |
| 2014/0331984 A1 * | 11/2014 | Brahler, II | F41H 13/0006 | |
| | | | 124/76 | |

* cited by examiner

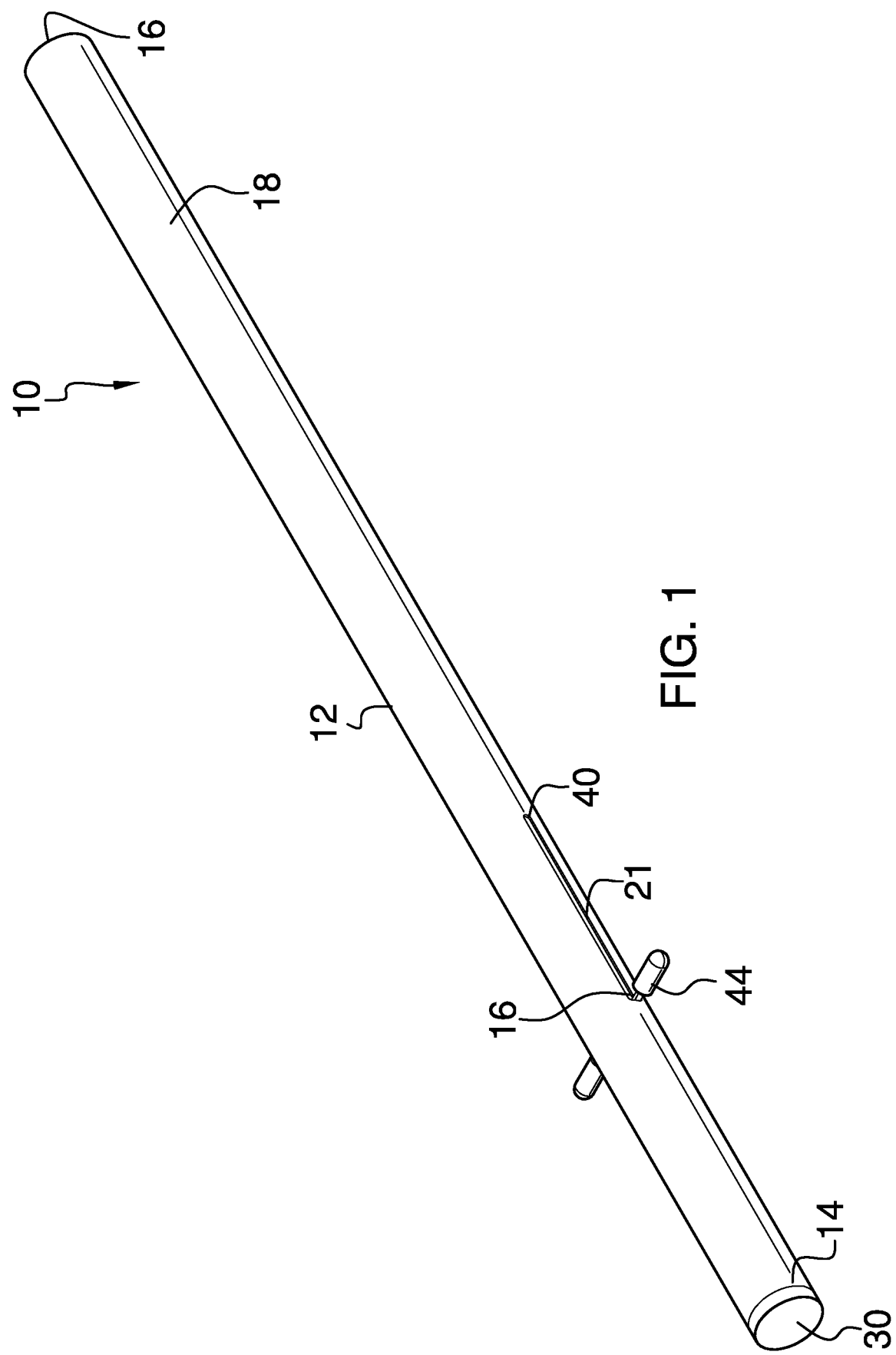

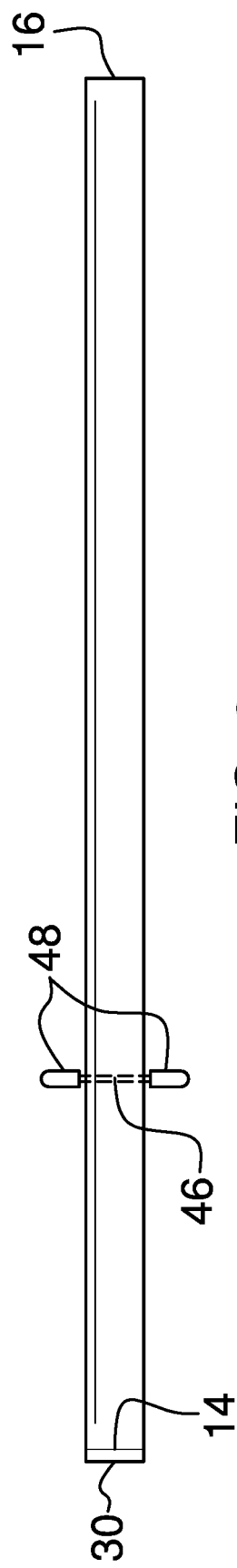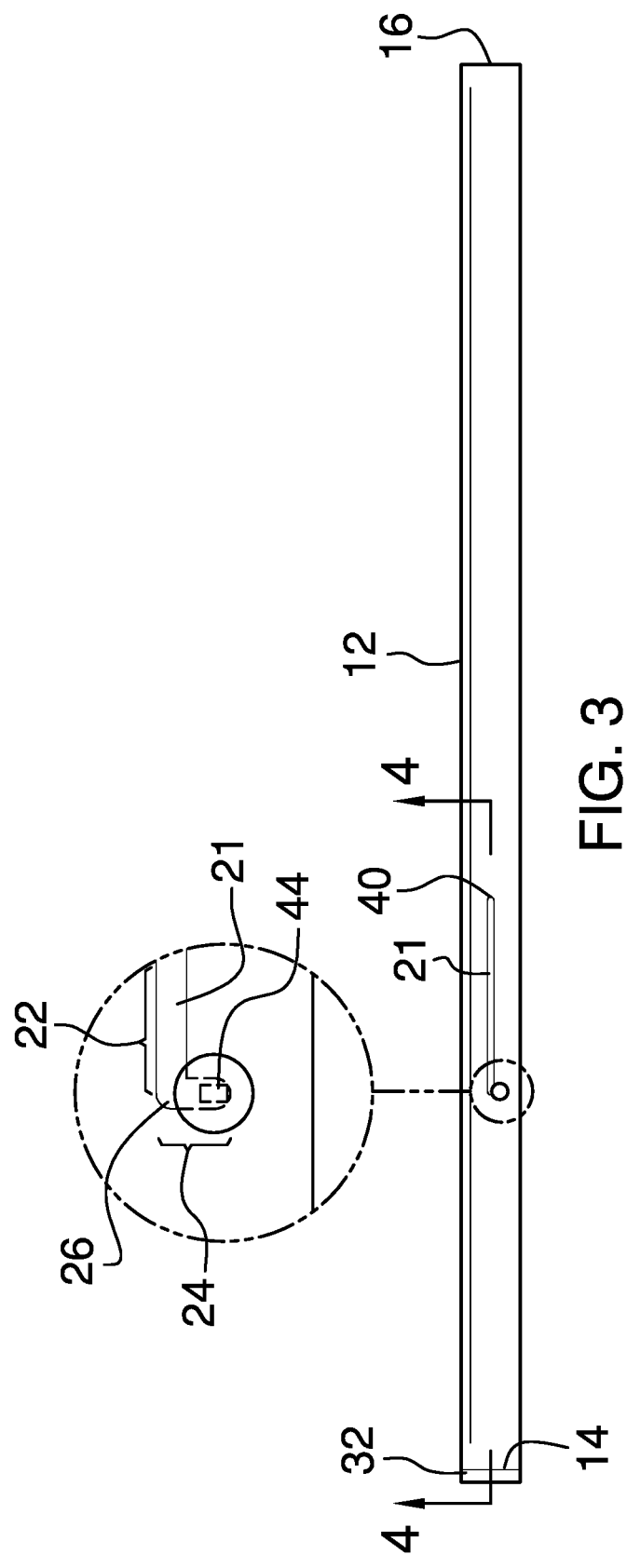

ANIMAL FEED LAUNCHER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to animal feeding devices and more particularly pertains to a new animal feeding device for feeding and attracting animals from a distance.

(2) Description of Related Art Including Information Disclosed Under 37 CFR 1.97 and 1.98

The prior art relates to animal feeding devices and tubular launchers. Existing devices employ complicated release mechanisms that may lend to higher cost, more failure, or louder noises that will scare animals. Existing devices also require the spring to be compressed from within the barrel rather than having an external grip point to carefully and quietly load spring.

BRIEF SUMMARY OF THE INVENTION

An embodiment of the disclosure meets the needs presented above by generally comprising a launch tube having a tube proximal end, a tube distal end, and a sidewall defining a tube inside. The sidewall has at least one cocking slot extending through to the tube inside. The tube inside is configured to slidingly receive a feed sock filled with animal feed. A cap is coupled to the launch tube within the tube proximal end. A disc is coupled within the launch tube and is slidably engaged within the tube inside. A compression spring is coupled to the disc and extends between the disc and the cap within the tube inside. A cocking pin coupled to the disc and extends through the cocking slot.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric view of an animal feed launcher apparatus according to an embodiment of the disclosure.

FIG. 2 is a top plan view of an embodiment of the disclosure.

FIG. 3 is a side elevation view of an embodiment of the disclosure.

DETAILED DESCRIPTION OF THE INVENTION

Figure 4:
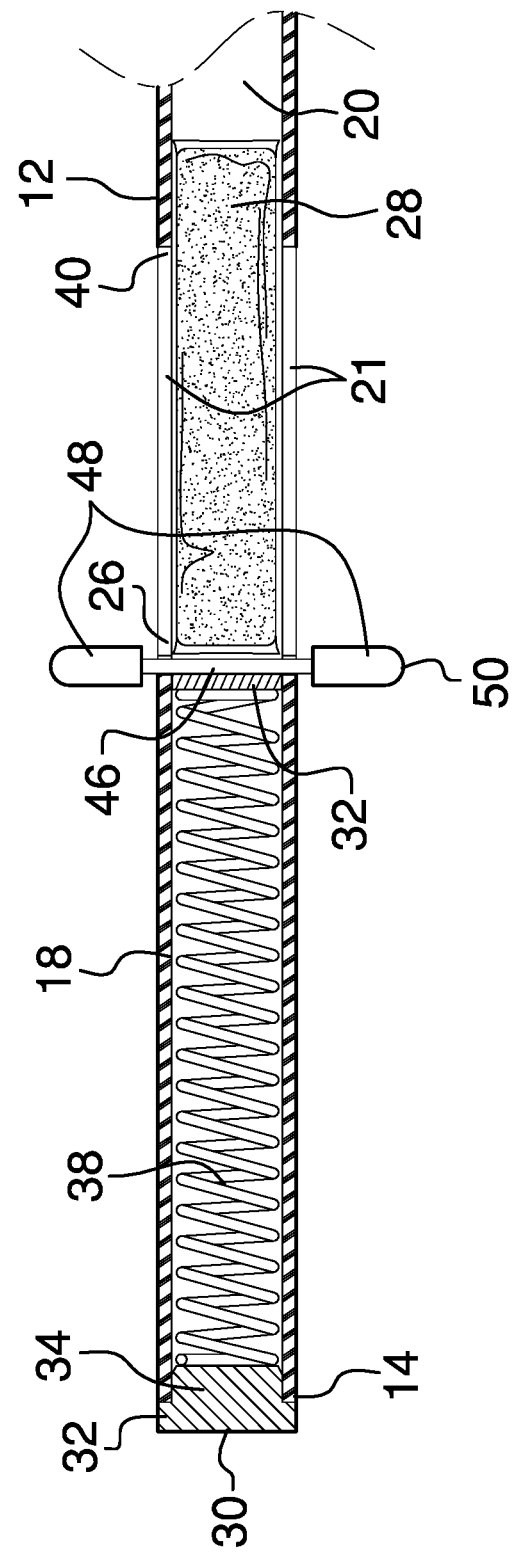
FIG. 4 is a cross-sectional view of an embodiment of the disclosure along the line 4-4 of FIG. 3.
Figure 5:
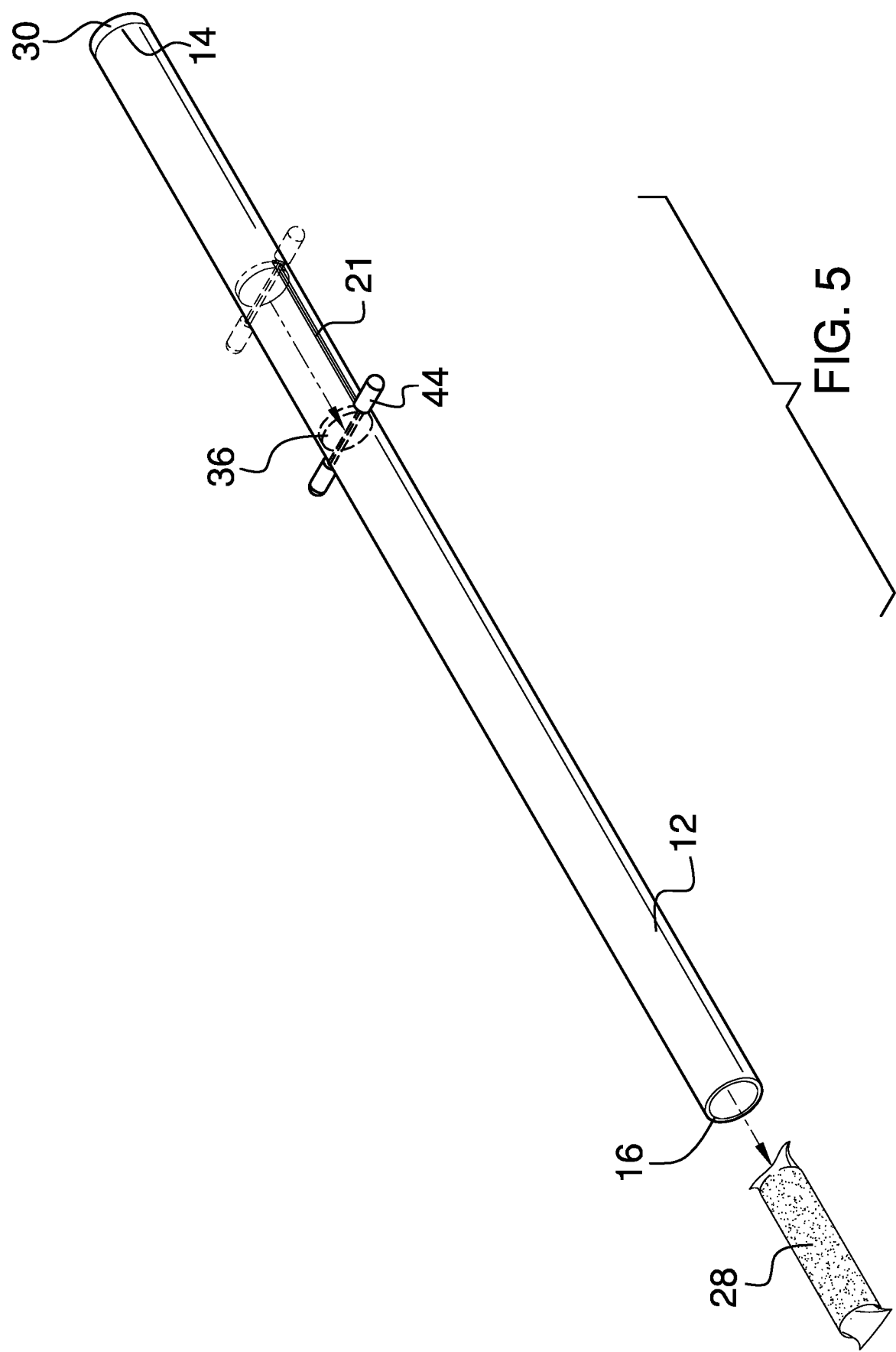
FIG. 5 is an in-use view of an embodiment of the disclosure.

With reference now to the drawings, and in particular to FIGS. 1 through 5 thereof, a new animal feeding device embodying the principles and concepts of an embodiment of the disclosure and generally designated by the reference numeral 10 will be described.

As best illustrated in FIGS. 1 through 5, the animal feed launcher apparatus 10 generally comprises a launch tube 12 having a tube proximal end 14, a tube distal end 16, and a sidewall 18 defining a tube inside 20. The sidewall 18 has at least one cocking slot 21 extending through to the tube inside 20. The at least one cocking slot 21 may be a pair of cocking slots 20 180° apart around the sidewall 18. Each cocking slot 21 may has a linear load portion 22 extending parallel to a central axis of the launch tube 12 and may have a keeper portion 24 extending perpendicularly from a slot proximal end 26 of each cocking slot 21. The tube inside 20 is configured to slidingly receive a feed sock 28 filled with animal feed.

A cap 30 is coupled to the launch tube 12 within the tube proximal end 14. The cap 30 may have an outer portion 32 conforming to the diameter of the sidewall and an inner portion 34 engaged within the tube inside 20. The cap 30 may be selectively removable from the launch tube 12 to easily access the tube inside 20 and perform repairs on the apparatus 10.

A disc 36 is coupled within the launch tube 12 and is slidably engaged within the tube inside 20. The disc 36 may be sufficiently thick to prevent unwanted rotation within the tube inside 20. A compression spring 38 is coupled to the disc 36. The compression spring 38 extends between the disc 36 and the cap 30 within the tube inside 20. In a rest position the compression spring 38 has a spring length equal to or greater than a distance from the cap 30 to a slot distal end 40 of each cocking slot 21. The compression spring 38 is compressible to a loaded position 42 with the spring length equal to the distance from the cap 30 to the slot proximal end 26.

A cocking pin 44 is coupled to the disc 36 and evenly extends through each cocking slot 21. The cocking pin 44 is selectively engageable within the keeper portion 24 of the cocking slots to maintain the compression spring 38 in the loaded position 42. The cocking pin 44 may have a medial rod portion 46 extending from within the tube inside 20 through each cocking slot 21 and a pair of grip portions 48 at each end of the medial rod portion 46. Each grip portion 48 is cylindrical and thicker than the medial rod portion 46 and may have a rounded outer end 50. The grip portions 48 thus provide a comfortable and safe place for a user to grip the apparatus and move the compression spring 38 from the rest position to the loaded position 42.

In use, the user places the feed sock 28 through the tube distal end 16 and slides it to contact the disc 36. The user then secures the grip portions 48 to pull the cocking pin 44 down until the medial rod portion is engaged within the keeper portion 24. The launch tube 12 is then aimed towards a desired location to send the feed sock 28 to provide food to live stock or wild animals, or to attract hunting prey. The cocking pin 44 is then knocked up out of the keeper portion 24 and the compression spring 38 then launches the disc 36 towards the tube distal end 16 until the cocking pin 44 contacts the slot distal end 40 of each cocking slot. The feed sock 28 is then projected out the tube distal end 16 to the desired location at a safe distance from the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal feed launcher apparatus and feed sock combination comprising:
    a feed sock, the feed sock being filled with animal feed;
    a launch tube having a tube proximal end, a tube distal end, and a sidewall defining a tube inside, the sidewall having at least one cocking slot extending through to the tube inside, the tube inside slidingly receiving the feed sock;
    a cap coupled to the launch tube, the cap being coupled within the tube proximal end;
    a disc coupled within the launch tube, the disc being slidably engaged within the tube inside;
    a compression spring coupled to the disc, the compression spring extending between the disc and the cap within the tube inside; and
    a cocking pin coupled to the disc, the cocking pin extending through the cocking slot.

2. The animal feed launcher apparatus of claim 1 further comprising the at least one cocking slot being a pair of cocking slots 180° apart around the sidewall; the cocking pin evenly extending through each cocking slot.

3. The animal feed launcher apparatus of claim 2 further comprising each cocking slot having a linear load portion extending parallel to a central axis of the launch tube and a keeper portion extending perpendicularly from a slot proximal end of the cocking slot, the cocking pin being selectively engageable within the keeper portion of the cocking slots to maintain the compression spring in a loaded position.

4. The animal feed launcher apparatus of claim 2 further comprising the cocking pin having a medial rod portion extending from within the tube inside through each cocking slot and a pair of grip portions at each end of the medial rod portion.

5. The animal feed launcher apparatus of claim 4 further comprising each grip portion being cylindrical and thicker than the medial rod portion and having a rounded outer end.

6. The animal feed launcher apparatus of claim 1 further comprising the cap having an outer portion conforming to a diameter of the sidewall and an inner portion engaged within the tube inside.

7. An animal feed launcher apparatus and feed sock combination comprising:
    a feed sock, the feed sock being filled with animal feed;
    a launch tube having a tube proximal end, a tube distal end, and a sidewall defining a tube inside, the sidewall having at least one cocking slot extending through to the tube inside, the at least one cocking slot being a pair of cocking slots 180° apart around the sidewall, each cocking slot having a linear load portion extending parallel to a central axis of the launch tube and a keeper portion extending perpendicularly from a slot proximal end of the cocking slot, the tube inside slidingly receiving the feed sock;
    a cap coupled to the launch tube, the cap being coupled within the tube proximal end, the cap having an outer portion conforming to a diameter of the sidewall and an inner portion engaged within the tube inside;
    a disc coupled within the launch tube, the disc being slidably engaged within the tube inside;
    a compression spring coupled to the disc, the compression spring extending between the disc and the cap within the tube inside; and
    a cocking pin coupled to the disc, the cocking pin evenly extending through each cocking slot, the cocking pin being selectively engageable within the keeper portion of the cocking slots to maintain the compression spring in a loaded position, the cocking pin having a medial rod portion extending from within the tube inside through each cocking slot and a pair of grip portions at each end of the medial rod portion, each grip portion being cylindrical and thicker than the medial rod portion and having a rounded outer end.

8. The animal feed launcher apparatus of claim 7 further comprising a slot length of the cocking slots being dimensioned to be less than a sock length of the feed sock.

* * * * *